US012664361B2

(12) United States Patent
Li et al.

(10) Patent No.: US 12,664,361 B2
(45) Date of Patent: Jun. 23, 2026

(54) SYSTEM AND METHOD OF PROGRAMMER-INTERPRETER APPROACH FOR LARGE LANGUAGE MODEL POST-EDITING

(71) Applicant: Openstream Inc., Bridgewater, NJ (US)

(72) Inventors: Zhuang Li, Glen Waverley (AU); Rajasekhar Tumuluri, Bridgewater, NJ (US); Ghlolamreza Haffari, Wheelers Hill (AU)

(73) Assignee: Openstream Inc., Bridgewater, NJ (US)

(*) Notice: Subject to any disclaimer, the term of this patent is extended or adjusted under 35 U.S.C. 154(b) by 237 days.

(21) Appl. No.: 18/756,077

(22) Filed: Jun. 27, 2024

(65) Prior Publication Data

US 2025/0005277 A1 Jan. 2, 2025

Related U.S. Application Data

(60) Provisional application No. 63/523,401, filed on Jun. 27, 2023.

(51) Int. Cl.
*G06F 17/27* (2006.01)
*G06F 40/166* (2020.01)
*G06F 40/20* (2020.01)

(52) U.S. Cl.
CPC ............ *G06F 40/20* (2020.01); *G06F 40/166* (2020.01)

(58) Field of Classification Search
CPC ........ G06F 40/166; G06F 40/56; G06F 40/20; G06F 40/30

(Continued)

(56) References Cited

FOREIGN PATENT DOCUMENTS

| CN | 112233664 | B | * | 11/2021 | ............. | G06N 3/044 |
| CN | 113761868 | B | * | 6/2023 | ............... | G06N 3/08 |

OTHER PUBLICATIONS

Hyung Won Chung, Le Hou, Shayne Longpre, Barret Zoph, Yi Tay, William Fedus, Eric Li, Xuezhi Wang, Mostafa Dehghani, Siddhartha Brahma, et al. 2022. Scaling instruction-finetuned language models. arXiv preprint arXiv:2210.11416.

(Continued)

*Primary Examiner* — Md S Elahee
(74) *Attorney, Agent, or Firm* — Young Basile Hanlon & MacFarlane, P.C.

(57) ABSTRACT

A system and method of programmer-interpreter approach for large language model post-editing is described. A method includes receiving, by a generator in a text generation system, an input, translating, by the generator, the input into an initial output text using at least a set of examples retrieved by a function in the generator when performing in-context learning, iteratively refining, by a programmer and an interpreter in the text generation system, the initial output text or intermediate output text, wherein the programmer encodes domain task-specific knowledge and the interpreter facilitates domain generalization, iteratively improving a quality of the initial output text or the intermediate output text in low-resource cross-domain text generation tasks by exploiting encoding of domain task-specific knowledge by the interpreter and facilitation of domain generalization by the interpreter, and outputting, by the text generation system, output text based on the initial output text and the intermediate output text.

21 Claims, 11 Drawing Sheets

(58) Field of Classification Search
USPC ............................................................. 704/9
See application file for complete search history.

(56) References Cited

OTHER PUBLICATIONS

Jay Gala, Pranjal A Chitale, Raghavan AK, Sumanth Doddapaneni, Varun Gumma, Aswanth Kumar, Janki Nawale, Anupama Sujatha, Ratish Puduppully, Vivek Raghavan, et al. 2023. Indictrans2: Towards high-quality and accessible machine translation models for all 22 scheduled indian languages. arXiv preprint arXiv:2305.16307.

Jiuzhou Han, Nigel Collier, Wray Buntine, and Ehsan Shareghi. 2023. Pive: Prompting with iterative verification improving graph-based generative capability of llms. arXiv preprint arXiv:2305.12392.

Levon Haroutunian, Zhuang Li, Lucian Galescu, Philip Cohen, Raj Tumuluri, and Gholamreza Haffari. 2023. Reranking for natural language generation from logical forms: A study based on large language models. arXiv preprint arXiv:2309.12294.

Viet Dac Lai, Nghia Trung Ngo, Amir Pouran Ben Veyseh, Hieu Man, Franck Dernoncourt, Trung Bui, and Thien Huu Nguyen. 2023. Chatgpt beyond english: Towards a comprehensive evaluation of large language models in multilingual learning. arXiv preprint arXiv:2304.05613.

Aman Madaan, Niket Tandon, Prakhar Gupta, Skyler Hallinan, Luyu Gao, Sarah Wiegreffe, Uri Alon, Nouha Dziri, Shrimai Prabhumoye, Yiming Yang, et al. 2023. Self-refine: Iterative refinement with self-feedback. arXiv preprint arXiv:2303.17651.

Kishore Papineni, Salim Roukos, Todd Ward, and Wei-Jing Zhu. 2002. Bleu: a method for automatic evaluation of machine translation. In Proceedings of the 40th annual meeting of the Association for Computational Linguistics, pp. 311-318.

Krishna Pillutla, Swabha Swayamdipta, Rowan Zellers, John Thickstun, Sean Welleck, Yejin Choi, and Zaïd Harchaoui. 2021. MAUVE: measuring the gap between neural text and human text using divergence frontiers. In Advances in Neural Information Processing Systems (NeurIPS), pp. 4816-4828.

Maja Popovic. 2017. chrf++: words helping character n-grams. In Proceedings of the second conference on machine translation, pp. 612-618.

Scott E. Reed and Nando de Freitas. 2016. Neural programmer-interpreters. In International Conference on Learning Representations (ICLR).

Ilya Sutskever, Oriol Vinyals, and Quoc V Le. 2014. Sequence to sequence learning with neural networks. Advances in neural information processing systems, 27.

Thuy Vu and Gholamreza Haffari. 2018. Automatic post-editing of machine translation: A neural programmer-interpreter approach. In Proceedings of the 2018 conference on empirical methods in natural language processing, pp. 3048-3053.

Jindong Wang, Hu Xixu, Wenxin Hou, Hao Chen, Runkai Zheng, Yidong Wang, Linyi Yang, Wei Ye, Haojun Huang, Xiubo Geng, et al. 2023. On the robustness of chatgpt: An adversarial and out-of-distribution perspective. In ICLR 2023 Workshop on Trustworthy and Reliable Large-Scale Machine Learning Models.

Sean Welleck, Ximing Lu, Peter West, Faeze Brahman, Tianxiao Shen, Daniel Khashabi, and Yejin Choi. 2022. Generating sequences by learning to self-correct. arXiv preprint arXiv:2211.00053.

Linting Xue, Noah Constant, Adam Roberts, Mihir Kale, Rami Al-Rfou, Aditya Siddhant, Aditya Barua, and Colin Raffel. 2021. mt5: A massively multilingual pre-trained text-to-text transformer. In Proceedings of the 2021 Conference of the North American Chapter of the Association for Computational Linguistics: Human Language Technologies, pp. 483-498.

Jingfeng Yang, Hongye Jin, Ruixiang Tang, Xiaotian Han, Qizhang Feng, Haoming Jiang, Bing Yin, and Xia Hu. 2023. Harnessing the power of llms in practice: A survey on chatgpt and beyond. arXiv preprint arXiv:2304.13712.

Terry Yue Zhuo, Zhuang Li, Yujin Huang, Fatemeh Shiri, Weiqing Wang, Gholamreza Haffari, and Yuan-Fang Li. 2023. On robustness of prompt-based semantic parsing with large pre-trained language model: An empirical study on codex. In Proceedings of the 17th Conference of the European Chapter of the Association for Computational Linguistics, pp. 1090-1102.

* cited by examiner

Figure 4:
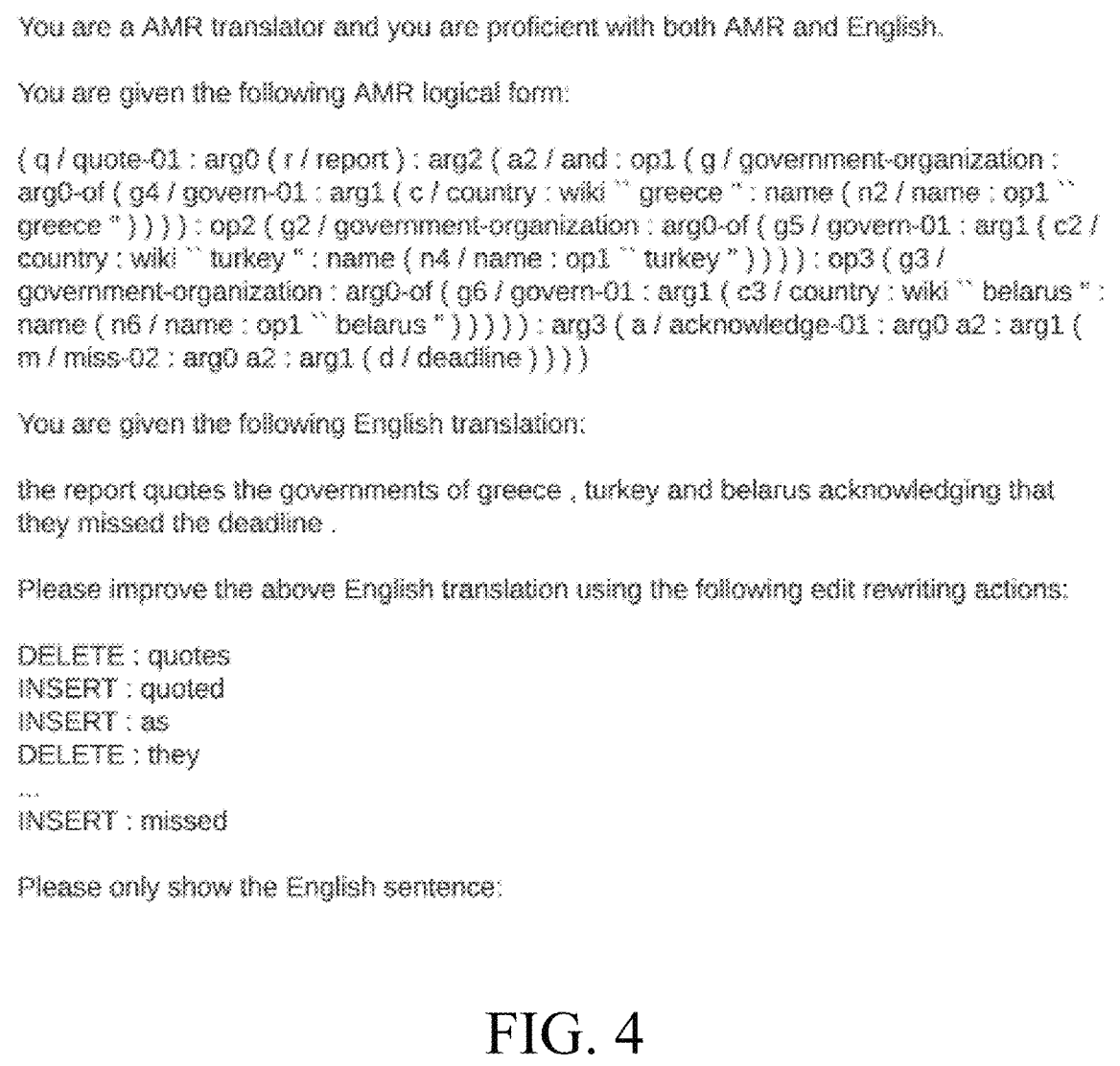

You are a AMR translator and you are proficient with both AMR and English.

You are given the following AMR logical form:

( q / quote-01 : arg0 ( r / report ) : arg2 ( a2 / and : op1 ( g / government-organization : arg0-of ( g4 / govern-01 : arg1 ( c / country : wiki " greece " : name ( n2 / name : op1 " greece " ) ) ) ) : op2 ( g2 / government-organization : arg0-of ( g5 / govern-01 : arg1 ( c2 / country : wiki " turkey " : name ( n4 / name : op1 " turkey " ) ) ) : op3 ( g3 / government-organization : arg0-of ( g6 / govern-01 : arg1 ( c3 / country : wiki " belarus " : name ( n6 / name : op1 " belarus " ) ) ) ) ) ) : arg3 ( a / acknowledge-01 : arg0 a2 : arg1 ( m / miss-02 : arg0 a2 : arg1 ( d / deadline ) ) ) )

You are given the following English translation:

the report quotes the governments of greece , turkey and belarus acknowledging that they missed the deadline .

Please improve the above English translation using the following edit rewriting actions:

DELETE : quotes
INSERT : quoted
INSERT : as
DELETE : they
...
INSERT : missed

Please only show the English sentence:

Figure 5:
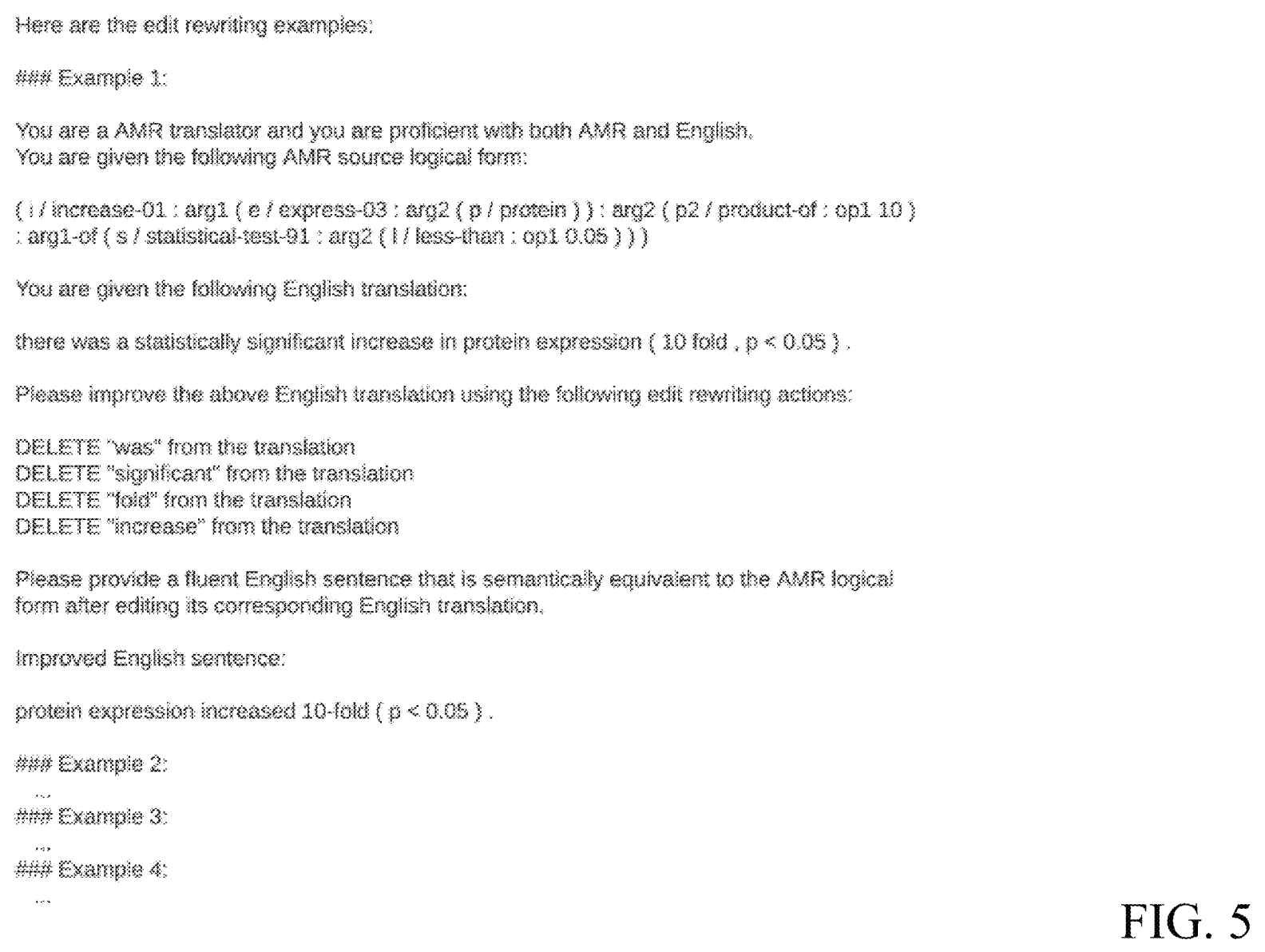

Here are the edit rewriting examples:

Example 1:

You are a AMR translator and you are proficient with both AMR and English.
You are given the following AMR source logical form.

( l / increase-01 : arg1 ( e / express-03 : arg2 ( p / protein ) ): arg2 ( p2 / product-of : op1 10 )
: arg1-of ( s / statistical-test-91 : arg2 ( l / less-than : op1 0.05 ) ) )

You are given the following English translation:

there was a statistically significant increase in protein expression ( 10 fold , p < 0.05 ) .

Please improve the above English translation using the following edit rewriting actions:

DELETE "was" from the translation
DELETE "significant" from the translation
DELETE "fold" from the translation
DELETE "increase" from the translation Please provide a fluent English sentence that is semantically equivalent to the AMR logical form after editing its corresponding English translation.

Improved English sentence:

protein expression increased 10-fold ( p < 0.05 ) .

Example 2:
    :
Example 3:
    :
Example 4:
    :

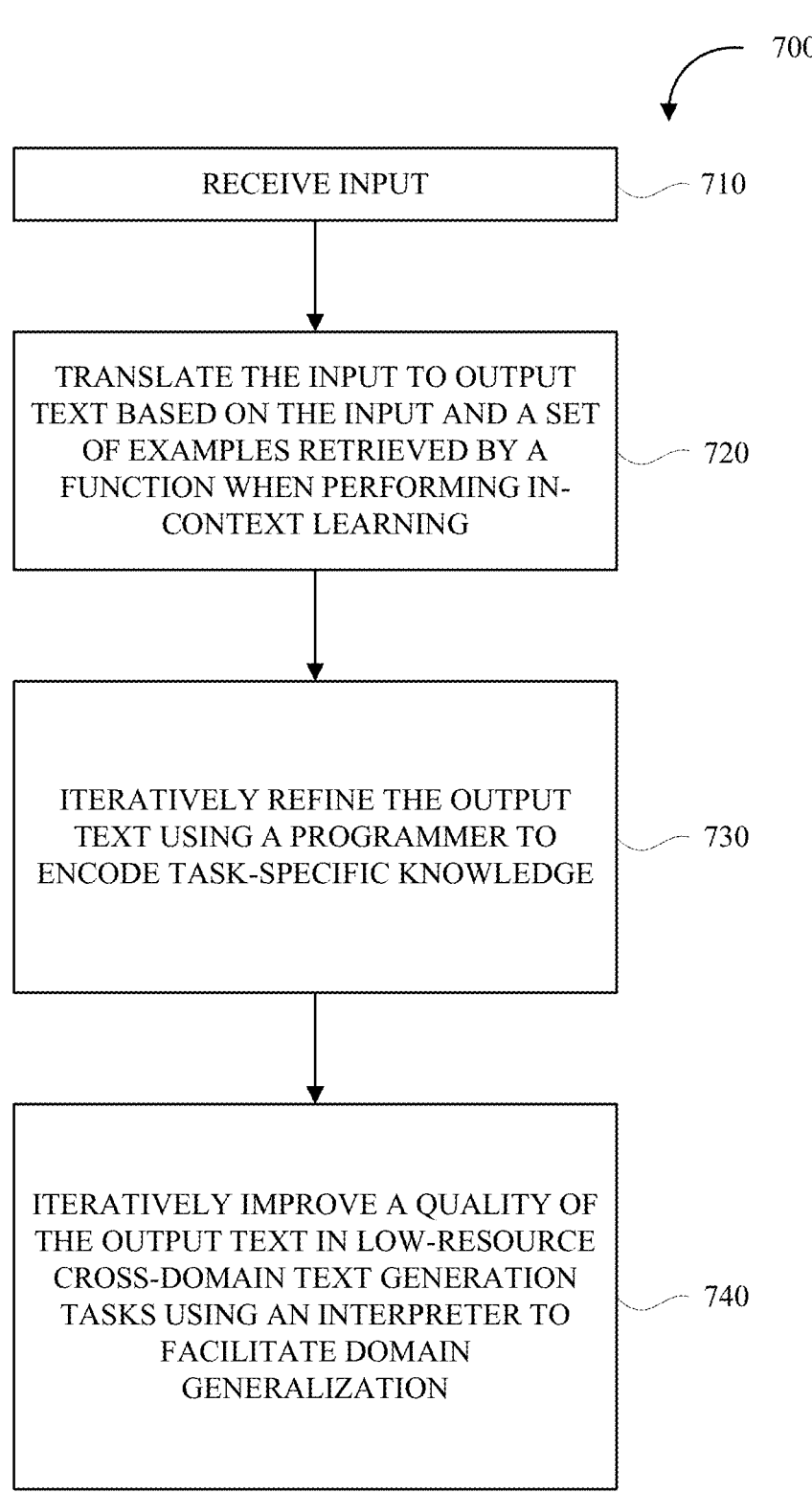

700

RECEIVE INPUT ⁓ 710

TRANSLATE THE INPUT TO OUTPUT
TEXT BASED ON THE INPUT AND A SET
OF EXAMPLES RETRIEVED BY A
FUNCTION WHEN PERFORMING IN-
CONTEXT LEARNING ⁓ 720

ITERATIVELY REFINE THE OUTPUT
TEXT USING A PROGRAMMER TO
ENCODE TASK-SPECIFIC KNOWLEDGE ⁓ 730

ITERATIVELY IMPROVE A QUALITY OF
THE OUTPUT TEXT IN LOW-RESOURCE
CROSS-DOMAIN TEXT GENERATION
TASKS USING AN INTERPRETER TO
FACILITATE DOMAIN
GENERALIZATION ⁓ 740

FIG. 7

| Method | MT (Kashmiri to English) | | | | | | LF-to-Text (AMR to English) | | |
| | GEN | | | CONV | | | Bio-AMR | | |
| | BLEU | BERT | ChrF++ | BLEU | BERT | ChrF++ | BLEU | BERT | ChrF++ |
| Fine-tuned mT5/flan-T5 | 16.58 | 89.32 | 41.77 | 13.19 | 88.83 | 33.03 | 9.27 | 87.90 | 41.06 |
| GPT-3.5 | | | | | | | | | |
| Initial | 9.21 | 87.29 | 34.30 | 5.92 | 87.24 | 26.23 | 9.63 | 88.57 | 43.98 |
| Self-Correct | 13.11 | 89.02 | 38.98 | 12.73 | 89.61 | 33.76 | 11.64 | 89.44 | 46.05 |
| Algo-Refine | 8.40 | 86.92 | 39.66 | 6.29 | 87.31 | 32.21 | 7.72 | 86.64 | 43.39 |
| Self-Refine | 8.13 | 86.54 | 31.78 | 4.73 | 86.55 | 24.13 | 8.67 | 87.34 | 39.63 |
| Prog-Refine (Zero-shot Act.) | 13.81 | 88.58 | 39.00 | 12.09 | 89.41 | 33.41 | 11.43 | 89.30 | 45.44 |
| Prog-Refine (Few-shot Act.) | 16.32 | 90.36 | 42.44 | 14.78 | 90.19 | 35.48 | 13.64 | 89.27 | 47.69 |
| Prog-Refine (ORACLE) | 43.48 | 92.11 | 65.29 | 43.42 | 93.00 | 42.42 | 27.77 | 90.01 | 52.86 |

FIG. 8

MT (Kashmiri to English)

| #Iter | BLEU | BERT | ChrF++ | NoAct% |
|-------|------|------|--------|--------|
| Iter 0 | 5.92 | 89.00 | 33.27 | 17.70 |
| Iter 1 | 11.01 | 89.18 | 33.05 | 79.71 |
| Iter 2 | 11.87 | 89.36 | 33.41 | 90.67 |
| Iter 3 | 12.09 | 89.41 | 33.41 | 95.28 |
| Iter 4 | 12.26 | 89.45 | 33.43 | 97.21 |
| Iter 5 | 12.36 | 89.47 | 33.39 | - |

FIG. 9

MT (Kashmiri to English)

| | BLEU | BERT | ChrF++ |
|---|---|---|---|
| Initial | 5.92 | 89.00 | 33.27 |
| Edit: DEL, INS | 12.36 | 89.47 | 33.39 |
| Edit: DEL | 12.27 | 89.42 | 33.21 |
| Edit: INS | 12.18 | 89.45 | 33.42 |
| Unordered: DEL, INS | 7.12 | 87.86 | 29.21 |
| Unordered: DEL | 6.52 | 87.51 | 26.46 |
| Unordered: INS | 7.14 | 88.04 | 30.38 |

FIG. 10

LF-to-Text (AMR to English)

| Method | BLEU | BERT | ChrF++ |
|---|---|---|---|
| Fine-tuned flan-T5 | 34.63 | 95.05 | 66.97 |
| GPT-3.5 | | | |
| Initial | 19.67 | 92.10 | 55.98 |
| Self-Correct | 34.49 | 94.68 | 66.81 |
| Self-Refine | 16.16 | 91.08 | 52.78 |
| Prog-Refine | 29.12 | 94.01 | 64.85 |

FIG. 11

LF-to-Text (AMR to English)

| Rate | BLEU | BERT | ChrF++ |
|---|---|---|---|
| 0.0 | 12.06 | 89.31 | 46.23 |
| 0.2 | 12.35 | 89.36 | 46.49 |
| 0.5 | 13.64 | 89.27 | 47.69 |
| 1.0 | 11.97 | 89.32 | 46.13 |

SYSTEM AND METHOD OF PROGRAMMER-INTERPRETER APPROACH FOR LARGE LANGUAGE MODEL POST-EDITING

CROSS-REFERENCE TO RELATED APPLICATIONS

The present application claims priority to and the benefit of U.S. Provisional Patent Application Ser. No. 63/523,401, filed Jun. 27, 2023, the contents of which are herein incorporated by reference as if set forth herein in its entirety.

BACKGROUND

Current large pre-trained language models like GPT-3.51 or GPT-4 have gained significant attention in natural language research. However, fine-tuning these models for specific tasks is challenging due to limited computational resources or inaccessible parameters. Consequently, many researchers resort to using web application programming interfaces (APIs) for instructing large language models (LLMs), leveraging zero-shot or few-shot in-context learning, enabling the LLMs to tackle tasks they weren't explicitly trained for. Unfortunately, this approach falls short when tackling some low-resource sequence generation tasks in machine translation (MT), and logical form (LF)-to-text translation. In this instance, low-resource languages refer to languages in which significantly less content is available online in contrast to high resource languages such as English or German. In this instance, a LF is XX is a formal representation executable by machines, such as the structured query language (SQL). The LF of a statement is a precisely specified semantic representation of that statement in a formalized manner, enabling machines to understand and process the statement's meaning for various tasks, including question-answering, information retrieval, and dialogue management. In such cases, minimal task-specific data is available during the LLMs' pre-training phase. The output quality of LLMs for such tasks is compromised due to the absence of task-specific knowledge.

To address this challenge, a promising set of solutions suggests integrating task-specific knowledge into language models through post-editing the generated text using a smaller model fine-tuned on task-specific data. Post-editing has proven effective in improving the quality of text generated by large language models (LLMs) such as GPT-3.5 or GPT-4, particularly when direct updating of their parameters to enhance text quality is infeasible or expensive. Yet, these methods are not without their drawbacks. Results indicate exclusive reliance on a smaller model for editing, e.g., Self-Correct as described in Sean Welleck, Ximing Lu, Peter West, Faeze Brahman, Tianxiao Shen, Daniel Khashabi, and Yejin Choi. 2022. Generating sequences by learning to self-correct, arXiv preprint arXiv:2211.00053 (herein Welleck et al., 2022), results in suboptimal performance in domain generalization scenarios, likely due to the inherently limited domain knowledge within these smaller models. That is, relying solely on smaller language models for post-editing can limit the LLMs' ability to generalize across domains. Moreover, the editing strategies in these methods are not optimally designed for text generation tasks.

SUMMARY

Described herein is a system and method of programmer-interpreter approach for large language model post-editing. In implementations, a method for enhancing text generation using a neural programmer-interpreter system includes receiving, by a generator in a text generation system, an input, translating, by the generator, the input into an initial output text using at least a set of examples retrieved by a function in the generator when performing in-context learning, iteratively refining, by a programmer and an interpreter in the text generation system, the initial output text or intermediate output text, wherein the programmer encodes domain task-specific knowledge and the interpreter facilitates domain generalization, iteratively improving, by the programmer and the interpreter, a quality of the initial output text or the intermediate output text in low-resource cross-domain text generation tasks by exploiting encoding of domain task-specific knowledge by the interpreter and facilitation of domain generalization by the interpreter, and outputting, by the text generation system, output text based on the initial output text and the intermediate output text.

BRIEF DESCRIPTION OF DRAWINGS

The various embodiments of the disclosure will hereinafter be described in conjunction with the appended drawings, provided to illustrate, and not to limit, the disclosure, wherein like designations denote like elements, and in which:

FIG. 4 is an example of zero-shot exemplary prompt for LF-to-Text in accordance with embodiments of this disclosure.

FIG. 5 is an example of few-shot exemplary prompt for LF-to-Text in accordance with embodiments of this disclosure.

FIG. 7 is an example of a method in accordance with embodiments of this disclosure.

FIGS. 8-12 show experimental results in accordance with embodiments of this disclosure.

DETAILED DESCRIPTION

Figure 1:
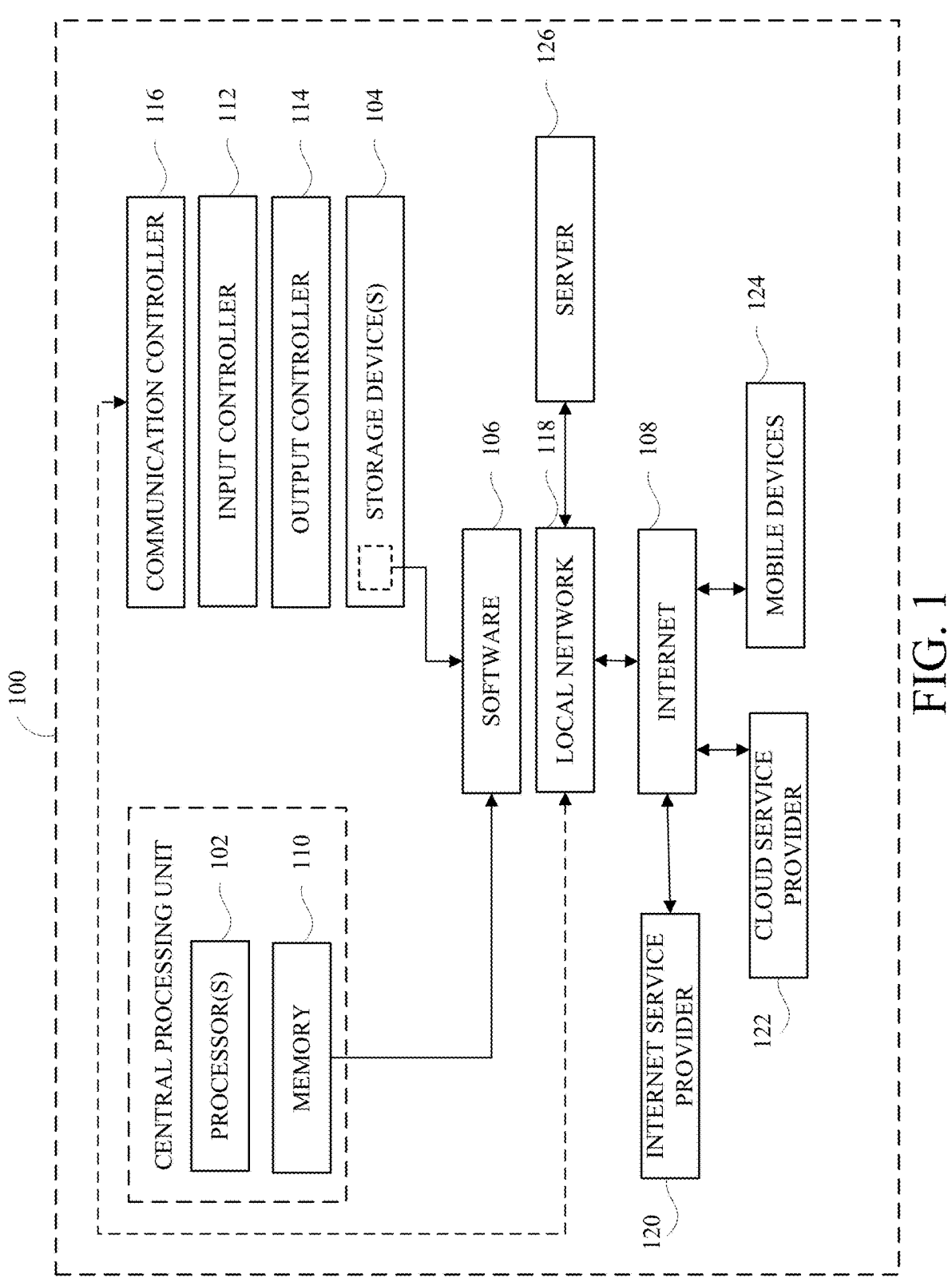
FIG. 1 is a block diagram of an example of a computing device in accordance with the embodiments of this disclosure.

Reference will now be made in greater detail to embodiments, examples of which are illustrated in the accompanying drawings. Wherever possible, the same reference numerals will be used throughout the drawings and the description to refer to the same or like parts.

As used herein, the terminology "server", "computer", "computing device or platform", or "cloud computing system" includes any unit, or combination of units, capable of performing any method, or any portion or portions thereof, disclosed herein. For example, the "server", "computer", "computing device or platform", or "cloud computing system" may include at least one or more processor(s).

As used herein, the terminology "processor" or "processing circuitry" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory and hardware that is hard-wired into the processing circuitry.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the term "memory" includes one or more memories, where each memory may be a computer-readable medium. A memory may encompass memory hardware units (e.g., a hard drive or a disk) that store data or instructions in software form. Alternatively or in addition, the memory may include data or instructions that are hard-wired into processing circuitry. The memory may include a single memory unit or multiple joint or disjoint memory units, which each of the multiple joint or disjoint memory units storing all or a portion of the data described as being stored in the memory.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. For example, the memory can be non-transitory. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks, or activities. For example, applications may perform one or more functions including, but not limited to, telephony, web browsers, e-commerce transactions, media players, scheduling, management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure and claims. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, and/or manufactures, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

FIG. 1 is a block diagram of a system that comprises a computing device 100 to which the present disclosure may be applied according to an embodiment of the present disclosure. The system includes at least one processor 102, designed to process instructions, for example computer readable instructions (i.e., code) stored on a storage device 104. By processing instructions, processor 102 may perform the steps and functions disclosed herein. Storage device 104 may be any type of storage device, for example, but not limited to an optical storage device, a magnetic storage device, a solid-state storage device, or a non-transitory storage device. The storage device 104 may contain software 106 which may include a set of instructions (i.e., code). Alternatively, instructions may be stored in one or more remote storage devices, for example storage devices accessed over a network or the internet 108. The computing device 100 also includes an operating system and microinstruction code. The various processes and functions described herein may either be part of the microinstruction code, part of the program, or a combination thereof, which is executed via the operating system. Computing device 100 additionally may have memory 110, an input controller 112, and an output controller 114 and communication controller 116. A bus (not shown) may operatively couple components of computing device 100, including processor 102, memory 110, storage device 104, input controller 112, output controller 114, and any other devices (e.g., network controllers, sound controllers, etc.). Output controller 114 may be operatively coupled (e.g., via a wired or wireless connection) to a display device such that output controller 114 is configured to transform the display on display device (e.g., in response to modules executed). Examples of a display device include, and are not limited to a monitor, television, mobile device screen, or touch-display. Input controller 112 may be operatively coupled via a wired or wireless connection to an input device such as a mouse, keyboard, touch pad, scanner, scroll-ball, or touch-display, for example. An input device (not shown) is configured to receive input from a user and transmit the received input to the computing device 100 vial the input controller 112. The input may be provided by the user through a multi-modal interface-based computer-implemented tool. These inputs are, but not limited to, images, speech, audio, text, facial expressions, body language, touch, scanned object, and video. The communication controller 116 is coupled to a bus (not shown) and provides a two-way coupling through a network link to the internet 108 that is connected to a local network 118 and operated by an internet service provider (ISP) 120 which provides data communication services to the internet 108. A network link may provide data communication through one or more networks to other data devices. For example, a network link may provide a connection through local network 218 to a host computer, to data equipment operated by the ISP 120. A cloud service provider 122 and mobile devices 124 provides data store and transfer services to other devices through internet 108. A server 126 may transmit a requested code for an application through internet 108, ISP 120, local network 118 and communication controller 116. FIG. 1 illustrates computing device 100 with all components as separate devices for case of identification only. Each of the components shown in FIG. 1 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 100 may be implemented as one or more servers, for example a farm of networked servers, a clustered server environment, or a cloud network of computing devices.

Large pre-trained language models like GPT-3.51 or GPT-42 have gained significant attention in natural language research. However, fine-tuning these models for specific tasks is challenging due to limited computational resources or inaccessible parameters. Consequently, many researchers resort to using web APIs for instructing LLMs, leveraging zero-shot or few-shot in-context learning, enabling the LLMs to tackle tasks they weren't explicitly trained for. Unfortunately, this approach falls short when tackling some low-resource sequence generation tasks in machine translation (MT), and logical form (LF)-to-text translation. In such cases, minimal task-specific data was available during the LLMs' pre-training phase. The output quality of LLMs for such tasks is compromised due to the absence of task-specific knowledge.

To address this challenge, a promising set of solutions suggests integrating task-specific knowledge into language models through post-editing the generated text using a smaller model fine-tuned on task-specific data. Yet, these methods are not without their drawbacks. Our findings indicate that exclusive reliance on a smaller model for editing results in suboptimal performance in domain generalization scenarios, likely due to the inherently limited domain knowledge within these smaller models.

Described herein is an innovative programmer-interpreter framework which benefits from the domain generalization ability from LLMs. A programmer component, a smaller language model finetuned on task-specific data, can deliver precise edit instructions to the output of the large language model, which can include outputs of a generator and/or an interpreter as described herein, thus infusing the large language model with task-specific knowledge. An interpreter, in turn, edits the large language model's output, which can include outputs of a generator and/or an interpreter on an iterative basis as described herein, given the provided edit instructions. Contrary to the Self-Correct approach of Welleck et al., 2022 that utilizes smaller, fine-tuned models for editing, the interpreter described herein is also an LLM. The editing is accomplished through the use of prompts that include editing instructions, eliminating the need for any additional fine-tuning. This distinct framework guarantees the preservation of the LLM's domain generalization ability while simultaneously benefiting from the task-specific knowledge encoded by the programmer. The described method distinguishes itself from approaches such as Pive from Jiuzhou Han, Nigel Collier, Wray Buntine, and Ehsan Shareghi, 2023, Pive: Prompting with iterative verification improving graph-based generative capability of LLMs, arXiv preprint arXiv:2305.12392 (herein Han et al., 2023), which employs an LLM as the interpreter but focuses on graph generation tasks. In contrast, the described system and method specifically designs word-level editing actions in the instructions, tailored to enhance text generation. This targeted strategy renders the described method more effective for text-generation tasks.

In implementations, the described programmer-interpreter method enhances LLM in low-resource cross-domain text generation tasks. This approach capitalizes on the programmer's ability to encode task-specific knowledge and the interpreter's prowess in domain generalization.

In implementations, editing operations are optimized for text generation tasks, leading to substantial text quality improvements by simply prompting the LLMs with action instructions.

In implementations, in scenarios where training and test data span different domains, the empirical studies confirm that the method outperforms all existing LLM post-editing baselines in low-resource MT and LF-to-Text translation.

Figure 2:
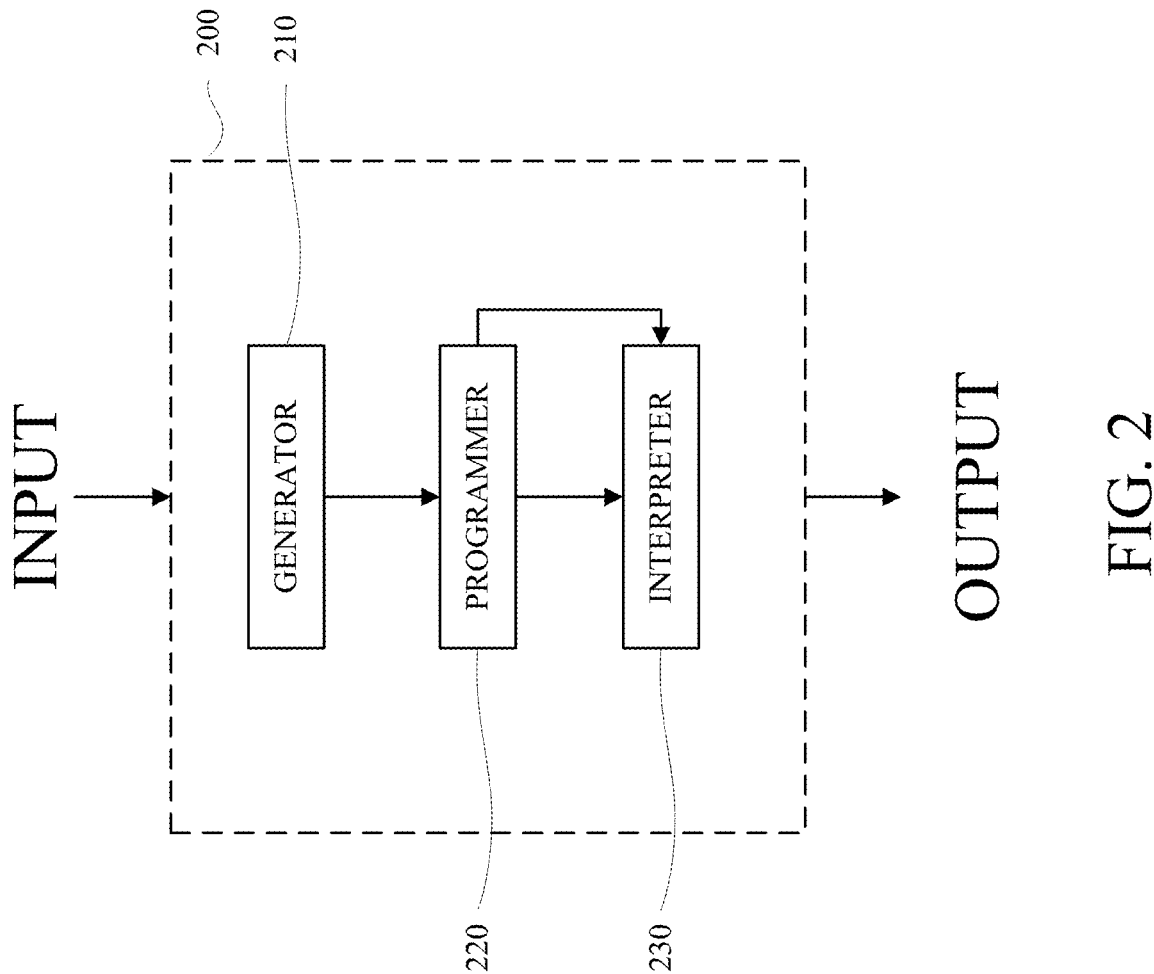
FIG. 2 is a block diagram of an example system in accordance with embodiments of this disclosure.
Figure 3:
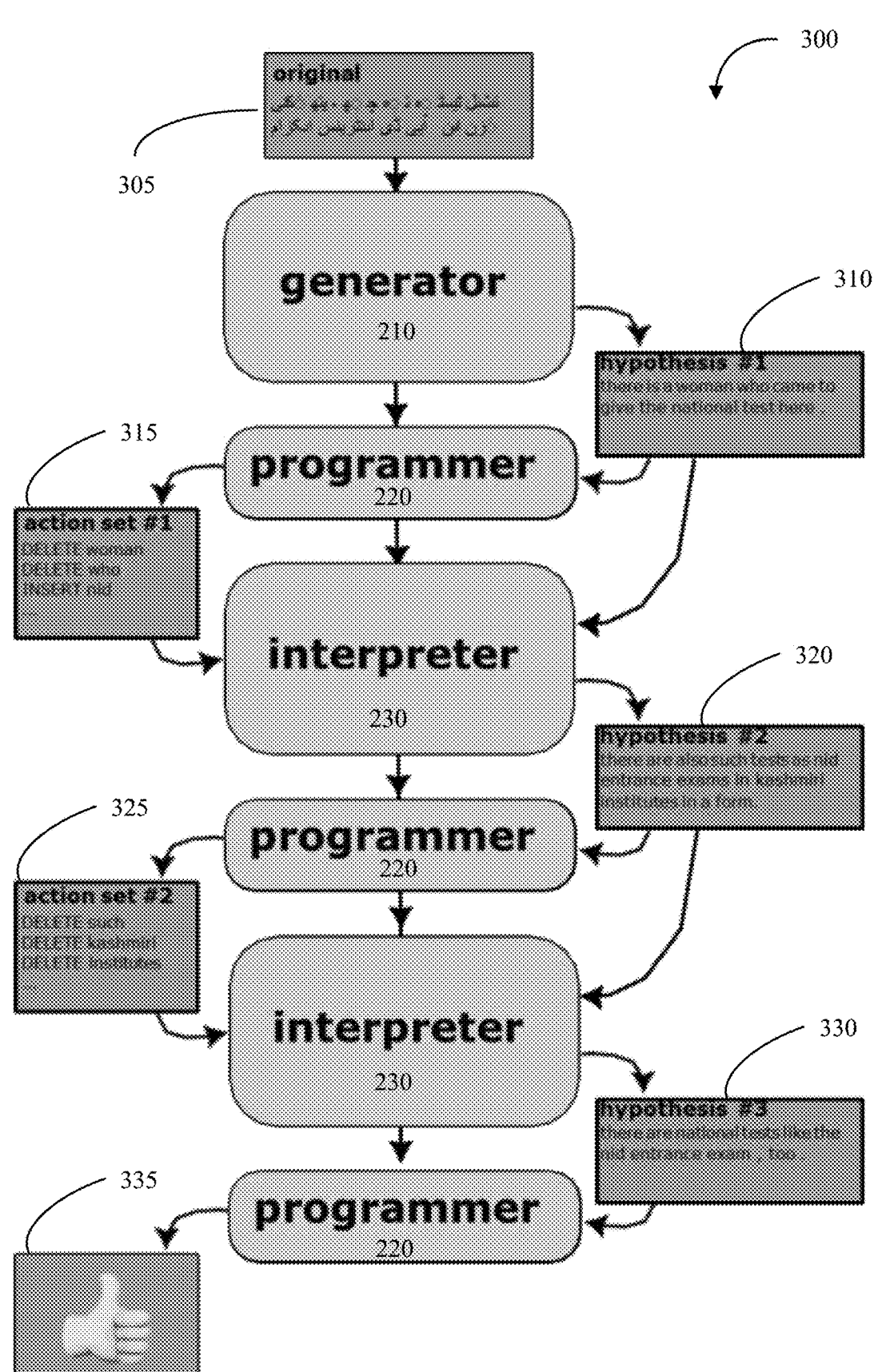
FIG. 3 is a block diagram of an example architecture or flow in accordance with embodiments of this disclosure.

FIG. 2 is a block diagram of an example text generation system 200 in accordance with embodiments of this disclosure. FIG. 3 is a block diagram of an example architecture or flow 300 in accordance with embodiments of this disclosure. The text generation system 200 can include a generator or generation engine (generator 210), a programmer or program engine (programmer 220), and an interpreter or interpretation engine (interpreter 230). The text generation system 200 and components therein operate and/or function as described herein.

The objective in LF-to-text and MT tasks using LLMs is to generate a high-quality output text y, denoted as y'=arg $\max_{y \in Y}$ P(y|x, C), given an input x (e.g., LF, source-language utterance) and an exemplar pool $$C = \{(x_j, y_j, y_j^*, a_j^*)\}_{j=1}^{|C|}.$$

Here, $x_i$ and $y_j$ are the ground truth input-output pairs, $$y_j^*$$

$y_j^*$ is the imperfect translation of $x_i$, and $$a_j^*$$

represents the Oracle, for example, edit actions that can modify $$y_j^*$$

into $y_j$. The method focuses on achieving high quality generation through iterative refinement of the initial output text produced by an LLM. Specifically, the iterative refinement framework includes three-parameterized engines or modules, the generator 210, the programmer 220, and the interpreter 230, which can be described in equation form as:

$$P(y'|x, C) =$$
$$P(y^0|x, M(\cdot)) \times \sum_{\{a, y\}}^{t-1} \prod_{i=0}^{t-1} P(y^{i+1}|a^i, y^i, x, A(\cdot)) \times P(a^i|y^i, x))$$

where Generator Interpreter Programmer

The generator 210 can correspond to a LLM, such as but not limited to, GPT-3.5, GPT-4, and the like. The generator 210 can produce an initial output text, $y^0$, given an input x, and a set of examples retrieved by a function M (x, C) when performing in-context learning. The programmer 220, a module that creates editing actions $a^i$ given x and the current imperfect output $y^i$, is a pre-trained sequence-to-sequence language model fine-tuned on a synthetic dataset. For example, the sequence-to-sequence language model can be one as described in Ilya Sutskever, Oriol Vinyals, and Quoc V Le. 2014, Sequence to sequence learning with neural networks, Advances in neural information processing systems, 27, mT5 as described in Linting Xue, Noah Constant, Adam Roberts, Mihir Kale, Rami Al-Rfou, Aditya Siddhant, Aditya Barua, and Colin Raffel. 2021. mt5: A massively multilingual pre-trained text-to-text transformer, In Proceedings of the 2021 Conference of the North American Chapter of the Association for Computational Linguistics: Human Language Technologies, pages 483-498, or flan-T5 as described in Hyung Won Chung, Le Hou, Shayne Longpre, Barret Zoph, Yi Tay, William Fedus, Eric Li, Xuezhi Wang, Mostafa Dehghani, Siddhartha Brahma, et al. 2022, Scaling instruction-finetuned language models, arXiv preprint arXiv:2210.11416, all of which are incorporated herein by reference as if set forth in their entireties. The interpreter 230, essentially also an LLM, refines the imperfect intermediate output $y^i$ by processing instructions that incorporate predicted editing actions and few-shot editing examples, retrieved via the function A (x, C). Note that the programmer 220 has much fewer parameters than the LLM used by the generator 210 and the interpreter 230. After several iterative refinements, the method arrives at a final output $y^t$ generated by the LLM (i.e., the text generation system 200). During generation, it is assumed that there is no access to the parameters of the LLMs and that the output text is obtained by providing prompting instructions.

To generate the initial output, the generator 210 is provided with a prompt composed of a few-shot set of exemplar pairs, denoted as $$M(x, C) = \{(x_j, y_j)\}_{j=1}^m,$$

selected from a pool of reference pairs C. This is accompanied by an instruction prompting the LLM to produce output $y^0$ based on the input x. The retrieval function identifies the closest pairs by calculating the cosine similarity of term frequency-inverse document frequency (TF-IDF) features between x and other instances of x in C.

After obtaining the initial or intermediate output $y^i$ from either the generator 210 or the interpreter 230, the input x and $y^i$ into a single sequence and feed to the programmer 220 to generate a sequence of edit actions $a^i$. A synthetic training set T is generated, extracted from the example pool C, for fine-tuning the programmer 220. Each pair in T is defined as $(x_{concat}, a^*)$, where $x_{concat}$ is the concatenated sequence of x and $y^*$, serving as the input for the programmer 220. The output $a^*$ is the sequence of Oracle edit actions, synthetically generated based on the reference pairs in C. For each reference $y \in C$, a word-level edit distance can be calculated to the imperfect translation $y^*$, generating intermediate edit actions. Only INSERT-word and DELETE-word actions are retained in the sequence, forming the final training sequence $a^*$ for the programmer 220. If $y^*$ is identical to the reference y, the action is labeled as "NoAction", indicating that no refinement is needed for that instance. Unlike PiVe, which generates the imperfect translation $y^*$ by scrambling the original y, the initial output $y^0$ is directly from the generator 210 as $y^*$ in both C and T. This approach enables the programmer 220 to learn an action distribution that more effectively corrects translation errors from LLMs.

To edit the intermediate output $y^i$, the LLM in the interpreter 230 is engaged by providing prompting instructions. Given the edit instructions $a^i$ and a pair $(y^i, x)$, the LLM in the interpreter 230 can INSERT or DELETE words in order to generate the modified text $y^{i+1}$. A few-shot examples that demonstrate editing procedures are incorporated, which are extracted from C and denoted as $$A(x, C) = \{(x_j, y_j, y_j^*, a_j^*)\}_{j=1}^{n}.$$

These examples are selected based on the cosine similarity between the TF-IDF features of x and those in C. Furthermore, to mimic action prediction errors from the programmer 220, an adversarial in-context learning strategy can be adopted. The adversarial in-context learning strategy can be similar to the approach in Terry Yue Zhuo, Zhuang Li, Yujin Huang, Fatemeh Shiri, Weiqing Wang, Gholamreza Haffari, and Yuan-Fang Li. 2023, On robustness of prompt-based semantic parsing with large pre-trained language model: An empirical study on codex, In Proceedings of the 17th Conference of the European Chapter of the Association for Computational Linguistics, pages 1090-1102, which is incorporated herein by reference as if set forth herein in its entirety. This involves corrupting the action sequence by deleting Oracle actions with a certain probability d %. If an action is not deleted, the action is swapped with other actions from C at the same probability d %. Through this manipulation, it has been discovered that the interpreter 230 LLM's (i.e., the LLM in the interpreter 230) exceptional text generalization ability enables it to effectively comprehend the editing instructions. As a result, the LLM in the interpreter 230 can generate high-quality text after performing the necessary edits, even if the predicted actions from the programmer 220 are not completely accurate. See FIGS. 4 and 5 for zero and few-shot instruction examples, respectively.

In FIG. 3, for a Kashmiri utterance input 305, the generator 210 can generate an output or output text (output 310). In this instance, Kashmiri is a low resource language and the generator 210 is a Kashmiri to English machine translator. Based on the initial output of the generator 210, the programmer 220 and the interpreter 230 can 1) iteratively refine and 2) interactively improve the quality output of the text generation system 200. The programmer 220, on an iterative basis, can apply task-specific knowledge in a domain or domain task-specific knowledge to generate editing actions (315 and 325) to refine the output of the generator 210 (initial output 310) or the interpreter 230 output (later iteration or intermediate outputs 320 and 330) based on the domain task-specific knowledge. Examples of task-specific knowledge for a sentence in a domain can include, but is not limited to, named entities, parts of speech, semantically dependent words, and the like. The interpreter 230 can apply the edit actions (315 and 325) to the output (310 and 320) and generalize by applying knowledge that is captured from cross-domain knowledge from other languages to improve the quality of output in that iteration based on cross-domain, especially for low-resource languages. This is because the corpus for low-resource language for training is minimal.

Returning to the example of FIG. 3, the cross-domain knowledge 'there is an NID entrance exam in Kashmir' is extracted by the interpreter 230 from a LLM trained with English corpus. So, the interpreter 230, after application of edit actions and the cross-domain knowledge, can refine the output (320) to "there are also such tests as nid entrance exams in Kashmiri institutes in a form." The programmer 220 again applies domain task-specific knowledge to generate edit actions (325). This time the domain task-specific knowledge is 'such', Kashmiri', 'Institutes', etc. The interpreter 230 again applies the edit actions and advantageously applies the cross-domain knowledge to refine the utterance into "there are national tests like the nid entrance exam, too"

(330). This is validated by the programmer 220 (335) as the output of the text generation system 200.

Figure 6:
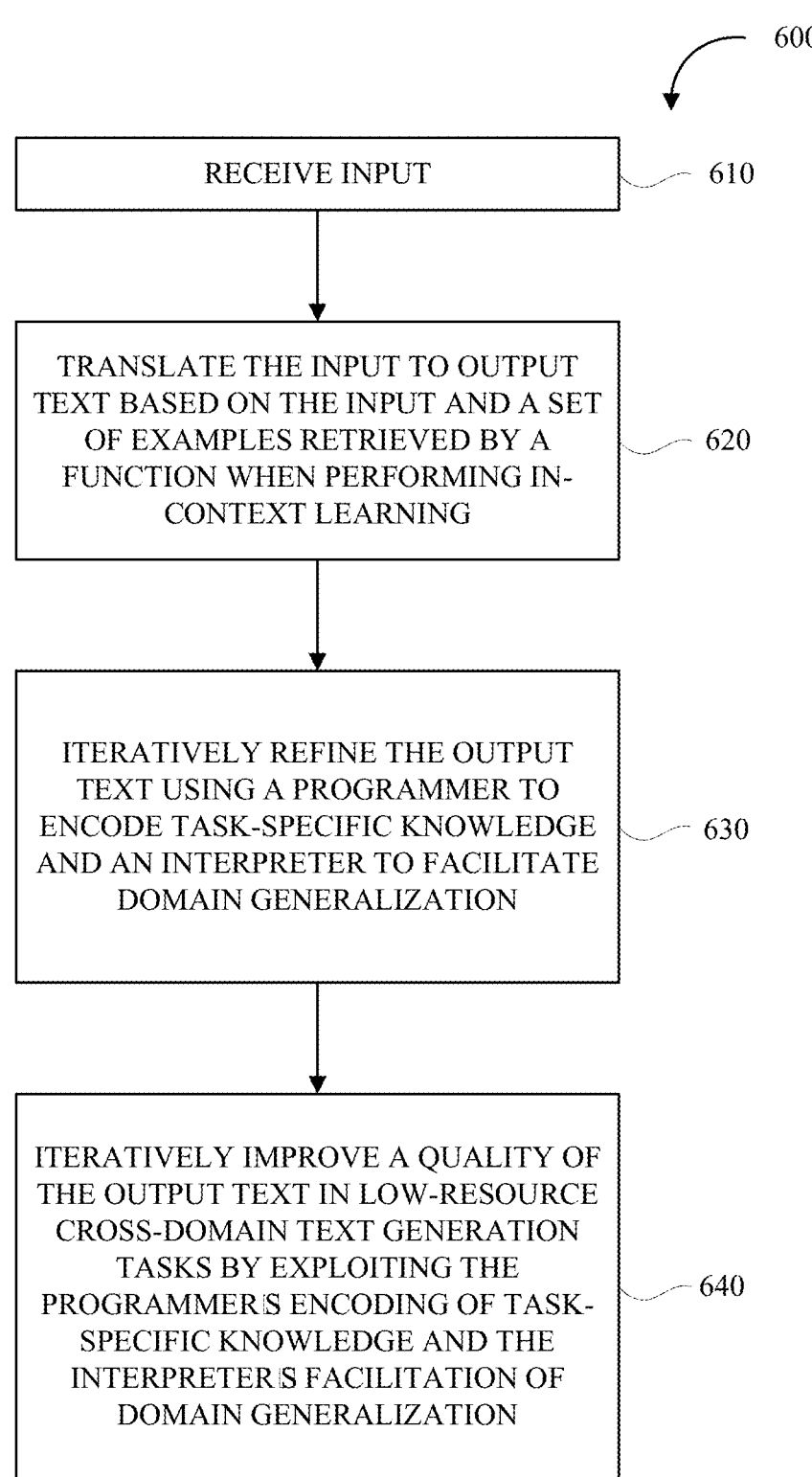
FIG. 6 is an example of a method in accordance with embodiments of this disclosure.

FIG. 6 is an example of a method 600 in accordance with embodiments of this disclosure. The method 600 includes: receiving 610 input; translating 620 the input to output text based on the input and a set of examples retrieved by a function when performing in-context learning; iteratively refining 630 the output text using a programmer to encode task-specific knowledge and an interpreter to facilitate domain generalization; and iteratively improving 640 a quality of the output text in low-resource cross-domain text generation tasks by exploiting the programmer's encoding of task-specific knowledge and the interpreter's facilitation of domain generalization. The method 600 can be implemented, for example, in or by components described with respect to FIGS. 1-3 and in conjunction with any of the flows described with respect to FIGS. 1-5 and 7-12, as appropriate and applicable.

The method 600 includes receiving 610 input. In implementations, the input can include but is not limited to, text, utterances which are processed by speech-to-text systems, images which are processed by image recognition systems, logical forms, source-language utterances, task-specific information, and/or the like.

The method 600 includes translating 620 the input to output text based on the input and a set of examples retrieved by a function when performing in-context learning. A generator as described herein can generate an initial output text for the input using in-context learning. In implementations, the generator is a LLM. The examples for the in-context learning can include, but is not limited to, ground truth input-output pairs and a plurality of editing operations to perform the in-context learning.

The method 600 includes iteratively refining 630 the output text using a programmer to encode task-specific knowledge and an interpreter to facilitate domain generalization and iteratively improving 640 a quality of the output text in low-resource cross-domain text generation tasks by exploiting the programmer's encoding of task-specific knowledge and the interpreter's facilitation of domain generalization. Both iterative operations are done collectively by the programmer and interpreter using an initial output text from the generator. The iterative refinement includes prompting the LLM of the interpreter 230 with edit action instructions, provided by the programmer, optimized for text generation tasks to improve text quality. In implementations, the programmer is a pre-trained sequence-to-sequence language model trained with a synthetic training dataset. In implementations, each sample in the synthetic training dataset to train the programmer is a pair comprising two sequences, the first sequence is a concatenated text of input and output texts of a generator/interpreter large language model, and the second sequence is a sequence of edit actions. The edit actions are synthetically generated using a pool of reference pairs. In implementations, the interpreter is a LLM with one or more prompting instructions. In implementations, the one or more prompting instructions can be one or more editing prompting actions. In implementations, the interpreter's large language model generates modified text by insert-word or delete-word edit actions, in order, on the programmer's output.

FIG. 7 is an example of a method 700 in accordance with embodiments of this disclosure. The method 700 includes: receiving 710 input; translating 720 the input to output text based on the input and a set of examples retrieved by a function when performing in-context learning; iteratively refining 730 the output text using a programmer to encode task-specific knowledge; and iteratively improving 740 a quality of the output text in low-resource cross-domain text generation tasks using an interpreter to facilitate domain generalization. The method 700 can be implemented, for example, in or by components described with respect to FIGS. 1-3 and in conjunction with any of the flows described with respect to FIGS. 1-6 and 8-12, as appropriate and applicable.

The method 700 includes receiving 710 input. In implementations, the input can include but is not limited to, text, utterances which are processed by speech-to-text systems, images which are processed by image recognition systems, logical forms, source-language utterances, task-specific information, and/or the like.

The method 700 includes translating 720 the input to output text based on the input and a set of examples retrieved by a function when performing in-context learning. A generator as described herein can generate an initial output text for the input using in-context learning. In implementations, the generator is a LLM. The examples for the in-context learning can include, but is not limited to, ground truth input-output pairs and a plurality of editing operations to perform the in-context learning.

The method 700 includes iteratively refining 730 the output text using a programmer to encode task-specific knowledge and iteratively improving 740 a quality of the output text in low-resource cross-domain text generation tasks using an interpreter to facilitate domain generalization. The iterative refinement includes prompting the LLM of the interpreter 230 with edit action instructions, provided by the programmer, optimized for text generation tasks to improve text quality. In implementations, the programmer is a pretrained sequence-to-sequence language model trained with a synthetic training dataset. In implementations, each sample in the synthetic training dataset to train the programmer is a pair comprising two sequences, the first sequence is a concatenated text of input and output texts of a generator/interpreter large language model, and the second sequence is a sequence of edit actions. The edit actions are synthetically generated using a pool of reference pairs. In implementations, the interpreter is a LLM with one or more prompting instructions. In implementations, the one or more prompting instructions can be one or more editing prompting actions. In implementations, the interpreter's large language model generates modified text by insert-word or delete-word edit actions, in order, on the programmer's output.

Described herein are experiments to confirm the method and system described herein. In the experiments, the experiments use GPT-3.5-turbo-0301 as the LLM for the generator 210 in both the zero-shot and few-shot settings. For the interpreter 230, the experiments use GPT-3.5-turbo-0301 in the zero-shot setting and GPT-3.5-turbo-16k4 in the few-shot setting. For the generator 210, across all settings and baselines, 0 and 5 shots were used for MT and LF-to-Text, respectively. For the interpreter 230, in the few-shot setting, 10 and 5 action examples were applied for MT and LF-to-Text, respectively, with a 50% action corruption probability. For the MT and LF-to-Text tasks, mT5-base and flan-T5-base were employed as the backbones of the programmers 220, respectively. These backbone choices are driven by emphasis on a computationally efficient setup, ensuring the models fit within an Nvidia V100 with 16 GB memory. The programmers 220 were trained with a development set to select the optimal model. The search for the best learning rate includes [5e-5, 1e-4, 2e-4], while the range of epochs considered is [5, 10, 20], with batch sizes 4. GPTs require no fine-tuning. Each generation of 1096 tokens costs approximately $0.0015. For Self-Correct and Self-Refine, five editing iterations were performed. Prog-Refine and Algo-Refine stop when more than 95% of action is 'NoAction'.

To simulate low-data scenarios, in the context of MT, a Kashmiri-English dataset from IndicTrans2 was used. Since Kashmiri is a notably low-resource language, translating it poses a formidable challenge for LLMs. The dataset provides 26,016 training pairs, which were used to generate synthetic data for action generation. The development set consists of 997 pairs. The dataset includes two distinct test sets, GEN and CONV, with 1,024 and 1,503 pairs, respectively. Each of the training, development, and test sets originates from different domains. For LF-to-Text, the AMR-LDC2.05 dataset was employed, which contains 22,550 AMR-English pairs for training and 1,368 pairs for development. For testing, a separate dataset, Bio-AMR6, was used, which offers 500 pairs in a different domain. Likewise, the AMR-to-Text task poses a low-resource challenge for LLMs.

The method (Prog-Refine), which utilizes zero-shot action exemplars (Zero-shot Act.) and few-shot action exemplars (Few-shot Act.) for interpreters, against five baseline methods and an ORACLE setting: i) Fine-tuned Models include mT5-base for MT and flan-T5-base for LF-to-Text generation, both of which are fine-tuned on the training set consisting of pairs (x, y) ∈C. These baseline models do not perform any refinement; ii) GPT-3.5+Initial simply applies the GPT-3.5 as the generator to obtain the text without any further refinement; iii) GPT-3.5+Self-Correct fine-tunes smaller models to be the interpreter, fixing the output errors of the large models given the feedback. Here, the edit actions produced by the programmer 220 are supplied as feedback to the fine-tuned interpreters. These interpreters are also built upon mT5-base or flan-T5-base; iv) GPT-3.5+Algo-Refine directly 'Insert' or 'Delete' specific words in certain positions of the generated text instead of using an interpreter to rewrite. Therefore, in this baseline, we also apply the Interpreter to predict the indices of words for actions; v) GPT-3.5+Self-Refine (Madaan et al., 2023) leverages an LLM to provide feedback for its own output, enabling self-refinement without the need for additional fine-tuning; vi) GPT-3.5+Prog-Refine (ORACLE) applies the ORACLE actions generated by comparing the reference in the test set with the initial output of the generator, allowing for optimal refinement after one iteration in the Zero-shot Act. setting.

For LF-to-Text and MT tasks, three evaluation metrics were used to assess the quality of the final output text generated by the Programmer-Interpreter framework. These are BLEU as described in Kishore Papineni, Salim Roukos, Todd Ward, and Wei-Jing Zhu. 2002. BLEU: a method for automatic evaluation of machine translation, In Proceedings of the 40th annual meeting of the Association for Computational Linguistics, pages 311-318, BERTScore as described in Tianyi Zhang, Varsha Kishore, Felix Wu, Kilian QWeinberger, and Yoav Artzi. BERTscore: Evaluating text generation with BERT. In International Conference on Learning Representations, and Chrf++ as described in Maja Popovi'c. 2017. chrf++: words helping character n-grams, In Proceedings of the second conference on machine translation, pages 612-618.

FIG. 8 shows the main results of MT on GEN and CONV test sets, and LF-to-Text on Bio-AMR test set and shows that GPT-3.5+Prog-Refine notably boosts the generator's performance (i.e., GPT-3.5+Initial), underlining the method's effectiveness in cross-domain scenarios by enhancing initial GPT-3.5 outputs. Moreover, the few-shot setting (Fewshot Act.) significantly outperforms both the zeroshot (Zero-shot Act.) setting and all other refinement baselines. It's also noteworthy that applying ORACLE action to the method can lead to a roughly 30-point increase in BLEU score. In comparison, Self-Refine shows minimal improvement, possibly due to its limited integration of task-specific knowledge. Algo-Refine inconsistently improves the initial text, lacking the robustness seen in the described method. We note that rewriting interpreters, as in the described method and Self-Correct, can eliminate invalid actions, thus enhancing editing quality. However, Algo-Refine does not possess this capability and is susceptible to incorrect feedback actions. The Self-Correct method, using a fine-tuned Interpreter, along with fine-tuned mT5/flan-T5 models, demonstrates better performance than other baselines across various tasks. This underscores the importance of learning task specific knowledge, especially in low-resource scenarios. Nonetheless, these methods face significant challenges in cross-domain applications, as further evidenced by the analysis shown in FIG. 11.

FIG. 9 shows the influence of multiple iterations on main results of MT using Prog-Refine (Zero-shot Act.) on CONV test set. NoAct %: The percentage of utterances requiring no refinement, as indicated by 'NoAction'. It is observed that Prog-Refine significantly improves the initial output generated by the generator. However, it only demonstrates marginal improvements in the subsequent outputs from the interpreter, even after four additional iterations. We hypothesize that this limited improvement may be attributed to training the model solely on synthetic data generated by the generator, so the action distribution might be different to the ones for modifying the output of the interpreter in the subsequent iterations.

We further examine the impact of solely utilizing one type of action and the influences of disregarding the sequence of these actions. In the setting with unordered actions, oracle actions are generated by simply contrasting the differences within two sentences' unordered sets of words. FIG. 10 shows the results of MT using Prog-Refine (Zeroshot Act.) on CONV test set with different types of actions. Edit: Actions are generated based on edit distance. Unordered: Actions without any specific order. INS: Insertion. DEL: Deletion. As depicted in FIG. 10, the Delete and Insert actions, when used individually, can deliver performance metrics on par with when they are combined. However, ignoring the order of actions can lead to a substantial decline in the refinement performance. This highlights that LLM editing methods like PiVe, which utilize unordered insertions, are not optimally suited for these tasks.

FIG. 11 shows LF-to-Text results using Prog-Refine (Zeroshot Act.) on the in-domain LDC test. As shown in FIG. 11, a domain shift dramatically impacts the performance of flan-T5 and Self-Correct. While both baseline models show markedly superior performance on the in-domain test set relative to the described system or model, the described system or model either surpasses or equals their performance in the cross-domain MT and AMR-to-Text test sets. This disparity in performance is likely due to the smaller models' limited cross-domain generalization. Similarly, in MT tasks, the experiments show that fine-tuned mT5 achieves 30 points of BLEU on the in-domain test but only 16 and 13 on out-of-domain tests.

FIG. 12 shows LF-to-Text results using Prog-Refine (Few-shot Act.) vary with different corruption probabilities for the action sequence in the adversarial in-context examples used for the Interpreter. FIG. 12 indicates 0.0 for no corruption and 1.0 for complete discarding of exemplar actions, leaving only $$\{(x_j, y_j^*, y_j)\}_{j=1}^n.$$

Rates between 0.0 and 1.0 represent partial corruption of Oracle actions. The results suggest that neither full application nor total corruption of Oracle actions is optimal. However, partial corruption leads to improved performance. Additionally, across all corruption rates, few-shot settings consistently outperform zero-shot settings.

Described herein is a programmer-interpreter method that iteratively refines LLM outputs using edit actions from a fine-tuned programmer and an LLM interpreter. The approach combines the task-specific encoding capacity of a fine-tuned model with the domain generalization strength of the LLM, incorporating specifically designed actions for text generation. The experiments confirm its efficacy, showing significant improvements in LLM-generated text quality for low-resource MT and LF-to-Text tasks. Moreover, the approach outperforms established baselines in cross-domain scenarios. The text generation system. i.e., the post-editing LLM, can produce low-resource MT and LF-to-Text tasks across different domains. The post-editing LLM outperforms existing LLM post-editing baselines in low-resource MT and LF-to-Text tasks across different domains.

In implementations, a method for enhancing text generation using a neural programmer-interpreter system includes receiving, by a generator in a text generation system, an input, translating, by the generator, the input into an initial output text using at least a set of examples retrieved by a function in the generator when performing in-context learning. iteratively refining, by a programmer and an interpreter in the text generation system, the initial output text or intermediate output text, wherein the programmer encodes domain task-specific knowledge and the interpreter facilitates domain generalization, iteratively improving, by the programmer and the interpreter, a quality of the initial output text or the intermediate output text in low-resource cross-domain text generation tasks by exploiting encoding of domain task-specific knowledge by the interpreter and facilitation of domain generalization by the interpreter, and outputting, by the text generation system, output text based on the initial output text and the intermediate output text.

In implementations, the generator is a large language model. In implementations, the set of examples includes ground truth input-output pairs and a plurality of editing operations to perform the in-context learning. In implementations, the iteratively refining further includes prompting, the interpreter by the programmer, with edit action instructions optimized for text generation tasks to improve text quality. In implementations, the programmer is a pre-trained sequence-to-sequence language model trained with a synthetic training dataset. In implementations, the interpreter is a large language model with one or more prompting instructions. In implementations, each sample in the synthetic training dataset to train the programmer is a pair of sequences including a first sequence, which is a concatenated text of inputs and output texts of the generator and the interpreter, and a second sequence is a sequence of edit actions. In implementations, the edit actions are synthetically generated using a pool of reference pairs. In implementations, the large language model of the interpreter generates modified text by insert-word or delete-word edit actions, in order, as prompted by the programmer.

In implementations, a text generation system includes an input interface configured to receive input, a large language model based generator configured to translate the input into an initial output text using at least a set of examples retrieved by a function in the generator when performing in-context learning, a programmer configured to encode domain task-specific knowledge, an interpreter configured to facilitate domain generalization using cross-domain knowledge, where the programmer and the interpreter are collectively configured to refine the initial output text or intermediate output text by encoding domain task-specific knowledge and facilitating domain generalization, respectively, and where the programmer and the interpreter are collectively configured to improve a quality of the initial output text or the intermediate output text in low-resource cross-domain text generation tasks by exploiting the encoding of domain task-specific knowledge by the interpreter and facilitation of domain generalization by the interpreter, and an output interface configured to output text based on the initial output text and the intermediate output text.

In implementations, the generator is a large language model. In implementations, the programmer is a pre-trained sequence-to-sequence language model trained with a synthetic training dataset. In implementations, each sample in the synthetic training dataset to train the programmer is a pair of sequences including a first sequence, which is a concatenated text of inputs and output texts of the generator and the interpreter, and a second sequence is a sequence of edit actions. In implementations, the interpreter is a large language model with one or more prompting instructions. In implementations, the set of examples includes ground truth input-output pairs and a plurality of editing operations to perform the in-context learning. In implementations, the programmer is further configured to prompt the interpreter with edit action instructions optimized for text generation tasks to improve text quality. In implementations, the edit actions are synthetically generated using a pool of reference pairs. In implementations, the large language model of the interpreter is configured to modify text by insert-word or delete-word edit actions, in order, as prompted by the programmer.

In implementations, a computer-implemented system for text generation enhancement includes a processor configured to receive input text from a user, a generator, a programmer, and an interpreter communicatively coupled to the processor, where the programmer is configured to encode domain task-specific knowledge and the interpreter is configured to facilitate domain generalization using cross-domain knowledge, and the processor further configured to iteratively refine an initial output text generated by the generator and intermediate output text generated by the interpreter using the programmer and the interpreter to enhance large language model performance in low-resource cross-domain text generation tasks.

In implementations, the processor is further configured to prompt the interpreter with action instructions optimized for text generation tasks to improve text quality of the initial output text or the intermediate output text during an iterative refinement process. In implementations, the generator is a large language model, the programmer is a pre-trained sequence-to-sequence language model trained with a synthetic training dataset, and the interpreter is a large language model with one or more prompting instructions.

While the embodiments described herein may be susceptible to various modifications and alternative forms, specific embodiments thereof are shown by way of example in the drawings and will be described in detail below. It should be understood, however that these examples not intended to limit the embodiments to the particular forms disclosed, but on the contrary, the disclosed embodiments cover all modifications, equivalents, and alternatives falling within the spirit and the scope of the disclosure as defined by the appended claims.

The method steps have been represented, wherever appropriate, by conventional symbols in the drawings, showing those specific details that are pertinent to understanding the embodiments so as not to obscure the disclosure with details that will be readily apparent to those of ordinary skill in the art having benefit of the description herein.

The terms "comprises," "comprising," or any other variations thereof, are intended to cover a non-exclusive inclusion, such that a process, method that comprises a list of steps does not include only those steps but may include other steps not expressly listed or inherent to such process or method. Similarly, one or more elements in a system or apparatus proceeded by "comprises . . . a" does not, without more constraints, preclude the existence of other elements or additional elements in the system or apparatus.

The features of the present embodiments are set forth with particularity in the appended claims. Each embodiment itself, together with further features and attended advantages, will become apparent from consideration of the following detailed description, taken in conjunction with the accompanying drawings.

The disclosed embodiments describe retrieving and organizing information from a set of applications, data sources, or both, by performing various steps as described in details in forthcoming sections.

Although some embodiments herein refer to methods, it will be appreciated by one skilled in the art that they may also be embodied as a system or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects may take the form of a computer program product embodied in one or more the computer readable mediums having the computer readable program code embodied thereon. For example, the computer readable mediums can be non-transitory. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

As used herein, the term "computer-readable medium" encompasses one or more computer-readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

Computer program code for carrying out operations for aspects may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects are described herein with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

Having described and illustrated the principles with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein.

Elements of the described embodiments shown in software may be implemented in hardware and vice versa. As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine-readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory. Modules can be defined by executable code stored on non-transient media.

The following description is presented to enable a person of ordinary skill in the art to make and use the embodiments and is provided in the context of the requirement for a obtaining a patent. The present description is the best presently-contemplated method for carrying out the present embodiments. Various modifications to the embodiments will be readily apparent to those skilled in the art and the generic principles of the present embodiments may be applied to other embodiments, and some features of the present embodiments may be used without the corresponding use of other features. Accordingly, the present embodiments are not intended to be limited to the embodiments shown but are to be accorded the widest scope consistent with the principles and features described herein.

What is claimed is:

1. A method for enhancing text generation using a neural programmer-interpreter system, the method comprising:

receiving, by a generator in a text generation system, an input;

translating, by the generator, the input into an initial output text using at least a set of examples retrieved by a function in the generator when performing in-context learning;

iteratively refining, by a programmer and an interpreter in the text generation system, the initial output text or intermediate output text, wherein the programmer encodes domain task-specific knowledge and the interpreter facilitates domain generalization;

iteratively improving, by the programmer and the interpreter, a quality of the initial output text or the intermediate output text in low-resource cross-domain text generation tasks by exploiting encoding of domain task-specific knowledge by the interpreter and facilitation of domain generalization by the interpreter; and outputting, by the text generation system, output text based on the initial output text and the intermediate output text.

2. The method of claim 1, wherein the generator is a large language model.

3. The method of claim 2, wherein the set of examples includes ground truth input-output pairs and a plurality of editing operations to perform the in-context learning.

4. The method of claim 3, wherein the iteratively refining further comprising:

prompting, the interpreter by the programmer, with edit action instructions optimized for text generation tasks to improve text quality.

5. The method of claim 2, wherein the programmer is a pre-trained sequence-to-sequence language model trained with a synthetic training dataset.

6. The method of claim 5, wherein the interpreter is a large language model with one or more prompting instructions.

7. The method of claim 6, wherein each sample in the synthetic training dataset to train the programmer is a pair of sequences including a first sequence, which is a concatenated text of inputs and output texts of the generator and the interpreter, and a second sequence is a sequence of edit actions.

8. The method of claim 7, wherein the edit actions are synthetically generated using a pool of reference pairs.

9. The method of claim 6, wherein the large language model of the interpreter generates modified text by insert-word edit actions or delete-word edit actions, in order, as prompted by the programmer.

10. A text generation system comprising:

an input interface configured to receive input;

a large language model based generator configured to translate the input into an initial output text using at least a set of examples retrieved by a function in the generator when performing in-context learning;

a programmer configured to encode domain task-specific knowledge;

an interpreter configured to facilitate domain generalization using cross-domain knowledge, wherein the programmer and the interpreter are collectively configured to refine the initial output text or intermediate output text by encoding domain task-specific knowledge and facilitating domain generalization, respectively, and wherein the programmer and the interpreter are collectively configured to improve a quality of the initial output text or the intermediate output text in low-resource cross-domain text generation tasks by exploiting the encoding of domain task-specific knowledge by the interpreter and facilitation of domain generalization by the interpreter; and an output interface configured to output text based on the initial output text and the intermediate output text.

11. The text generation system of claim 10, wherein the generator is a large language model.

12. The text generation system of claim 11, wherein the programmer is a pre-trained sequence-to-sequence language model trained with a synthetic training dataset.

13. The text generation system of claim 12, wherein each sample in the synthetic training dataset to train the programmer is a pair of sequences including a first sequence, which is a concatenated text of inputs and output texts of the generator and the interpreter, and a second sequence is a sequence of edit actions.

14. The text generation system of claim 12, wherein the interpreter is a large language model with one or more prompting instructions.

15. The text generation system of claim 14, wherein the set of examples includes ground truth input-output pairs and a plurality of editing operations to perform the in-context learning.

16. The text generation system of claim 14, wherein the programmer is further configured to:

prompt the interpreter with edit action instructions optimized for text generation tasks to improve text quality.

17. The text generation system of claim 16, wherein the edit actions are synthetically generated using a pool of reference pairs.

18. The text generation system of claim 16, wherein the large language model of the interpreter is configured to:

modify text by insert-word edit actions or delete-word edit actions, in order, as prompted by the programmer.

19. A computer-implemented system for text generation enhancement, comprising:

a processor configured to receive input text from a user;

a generator, a programmer, and an interpreter communicatively coupled to the processor, wherein the programmer is configured to encode domain task-specific knowledge and the interpreter is configured to facilitate domain generalization using cross-domain knowledge; and the processor further configured to iteratively refine an initial output text generated by the generator and intermediate output text generated by the interpreter using the programmer and the interpreter to enhance large language model performance in low-resource cross-domain text generation tasks.

20. The computer-implemented system of claim 19, wherein the processor is further configured to prompt the interpreter with action instructions optimized for text generation tasks to improve text quality of the initial output text or the intermediate output text during an iterative refinement process.

21. The computer-implemented system of claim 20, wherein:

the generator is a large language model;

the programmer is a pre-trained sequence-to-sequence language model trained with a synthetic training dataset; and the interpreter is a large language model with one or more prompting instructions.

* * * * *